United States Patent
Jayasuriya et al.

(10) Patent No.: US 6,568,743 B1
(45) Date of Patent: May 27, 2003

(54) ACTIVE ARMREST FOR SIDE IMPACT PROTECTION

(75) Inventors: A. Mangala M. Jayasuriya, Bloomfield Hills, MI (US); Nripen Kumar Saha, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/064,685

(22) Filed: Aug. 7, 2002

(51) Int. Cl.[7] .................................................. B60J 9/00
(52) U.S. Cl. ....................... 296/153; 296/189
(58) Field of Search ............................. 296/146.6, 153, 296/189

(56) References Cited

U.S. PATENT DOCUMENTS

| | | | |
|---|---|---|---|
| 4,272,103 A | * | 6/1981 | Schmid et al. |
| 4,783,114 A | * | 11/1988 | Welch |
| 4,890,877 A | | 1/1990 | Ashtiani-Zarandi et al. |
| 5,141,279 A | * | 8/1992 | Weller |
| 5,181,759 A | * | 1/1993 | Doolittle |
| 5,306,066 A | | 4/1994 | Saathoff |
| 5,356,177 A | | 10/1994 | Weller |
| 5,445,430 A | | 8/1995 | Nichols |
| 5,482,344 A | * | 1/1996 | Walker et al. |
| 5,527,084 A | | 6/1996 | Scherf |
| 5,716,093 A | | 2/1998 | Sadr |
| 5,857,702 A | * | 1/1999 | Suga et al. |
| 5,951,094 A | | 9/1999 | Konishi et al. |
| 6,183,038 B1 | | 2/2001 | Hansen et al. |
| 6,203,096 B1 | * | 3/2001 | Noda et al. |
| 6,247,745 B1 | | 6/2001 | Carroll, III et al. |
| 2002/0195833 A1 | * | 12/2002 | Fukutomi |

* cited by examiner

Primary Examiner—D. Glenn Dayoan
Assistant Examiner—Scott Carpenter
(74) Attorney, Agent, or Firm—Gary A. Smith

(57) ABSTRACT

A motor vehicle occupant protection system features an upper panel of an armrest is maintained in an arm supporting position during normal vehicle operation, and is moved to a safety position by an actuation device upon sensing of an actual or impending impact on the side of the vehicle. In the arm supporting position, the arm support panel contributes to the structural strength of the armrest so that it is able to withstand rugged use. In the safety position, the arm support panel is positioned so that it does not present a rigid edge oriented directly toward the occupant, but rather is in a partially or completely folded position. Both mechanical and electronic actuation systems are disclosed.

20 Claims, 5 Drawing Sheets

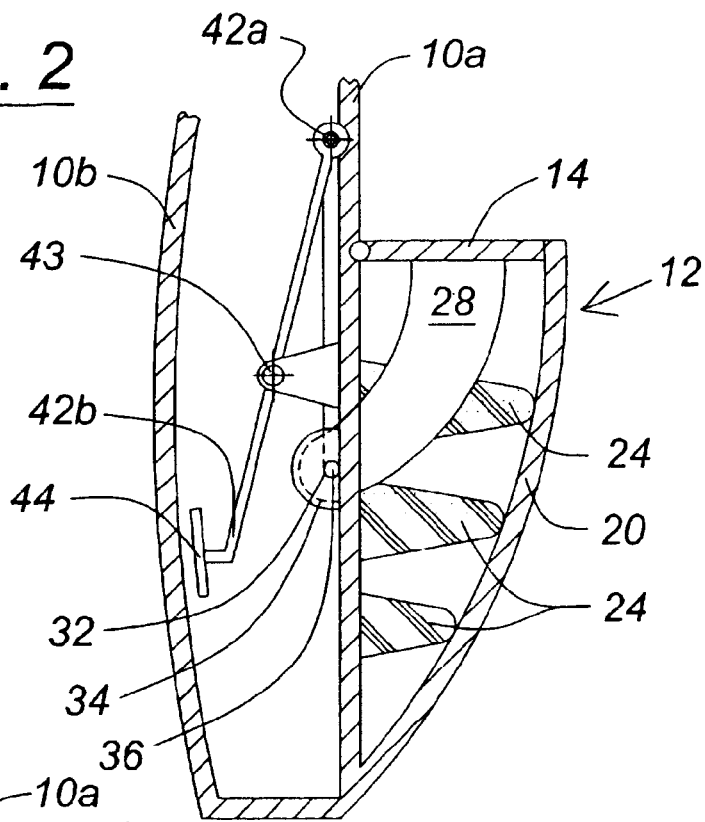
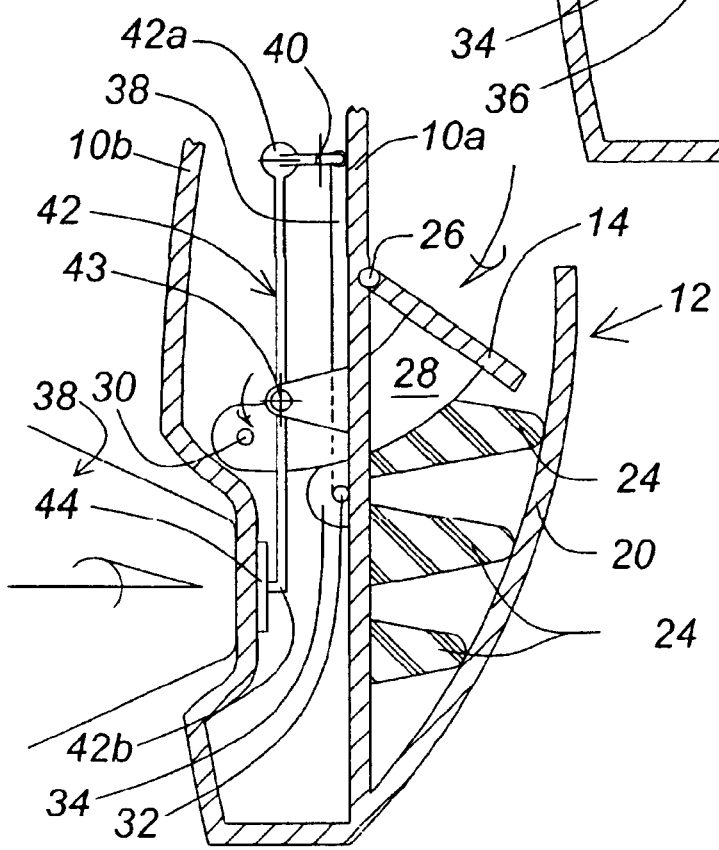

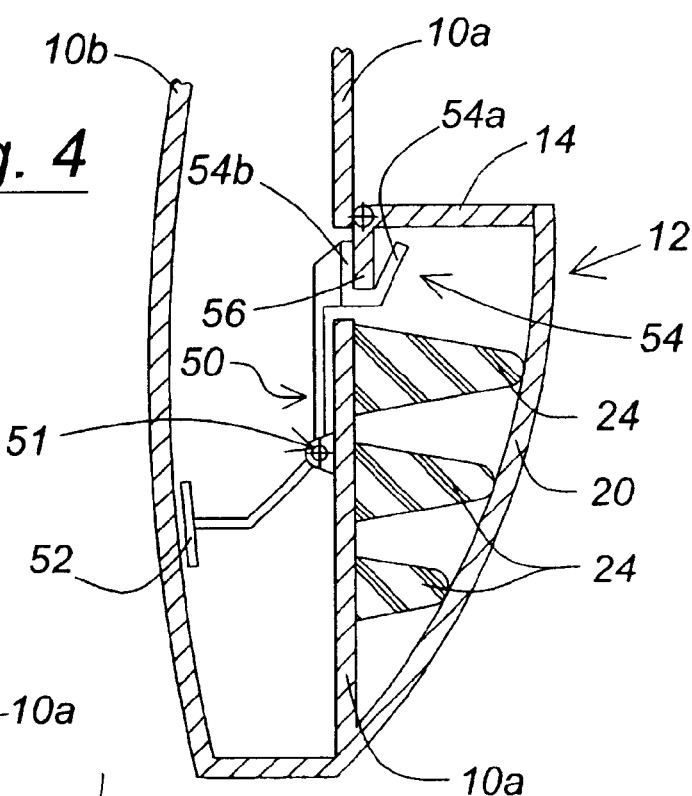
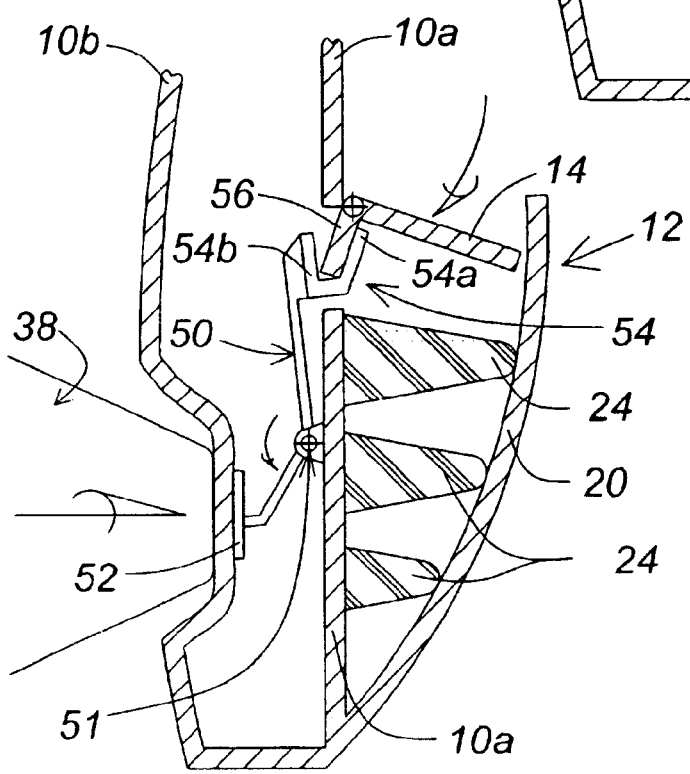

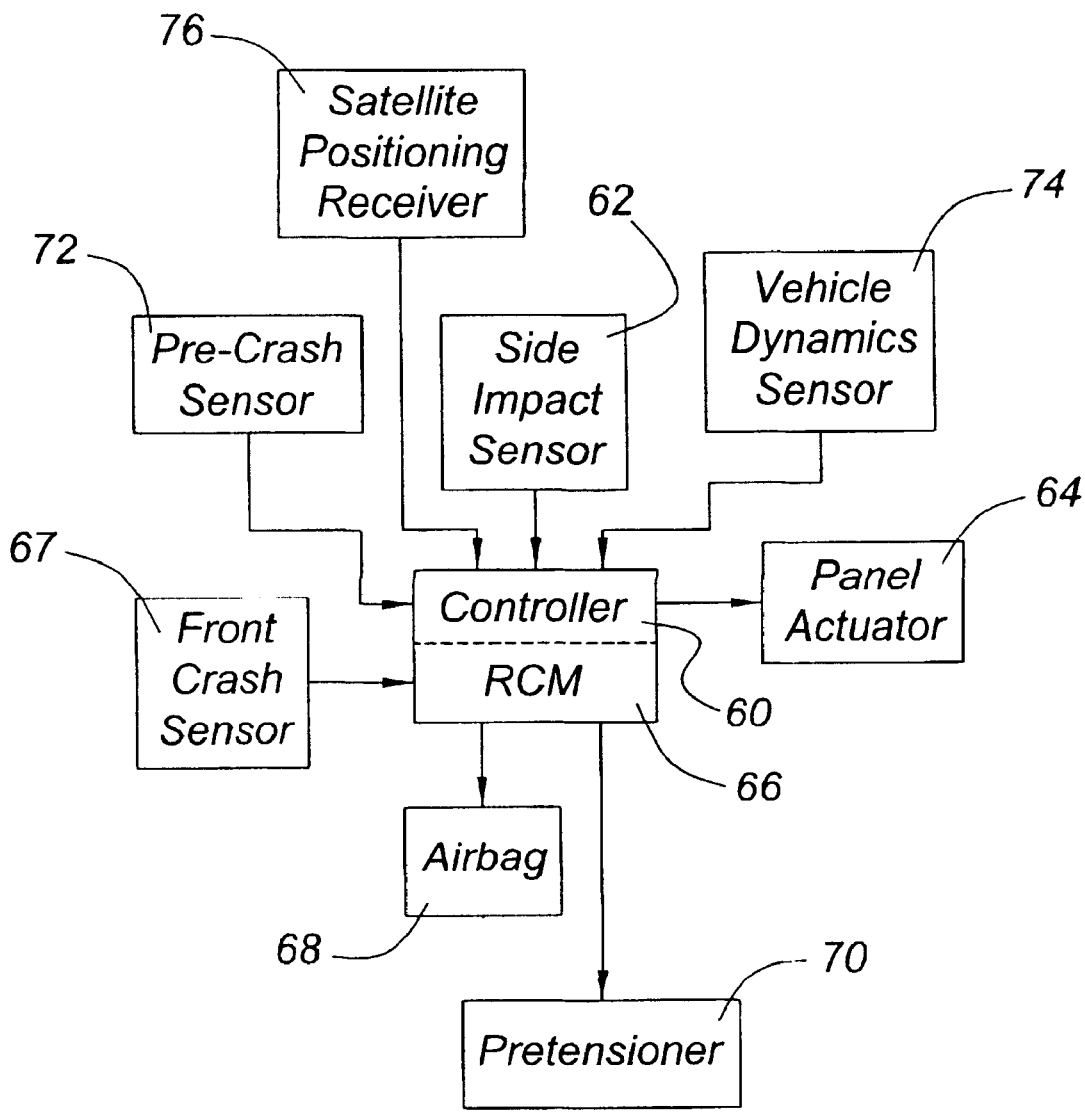

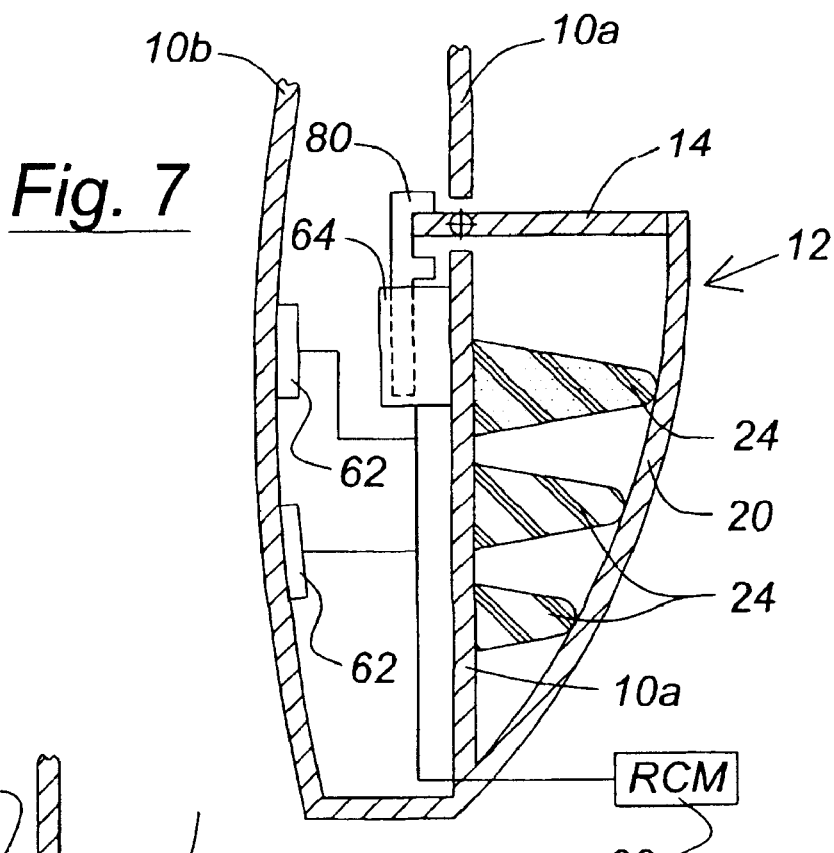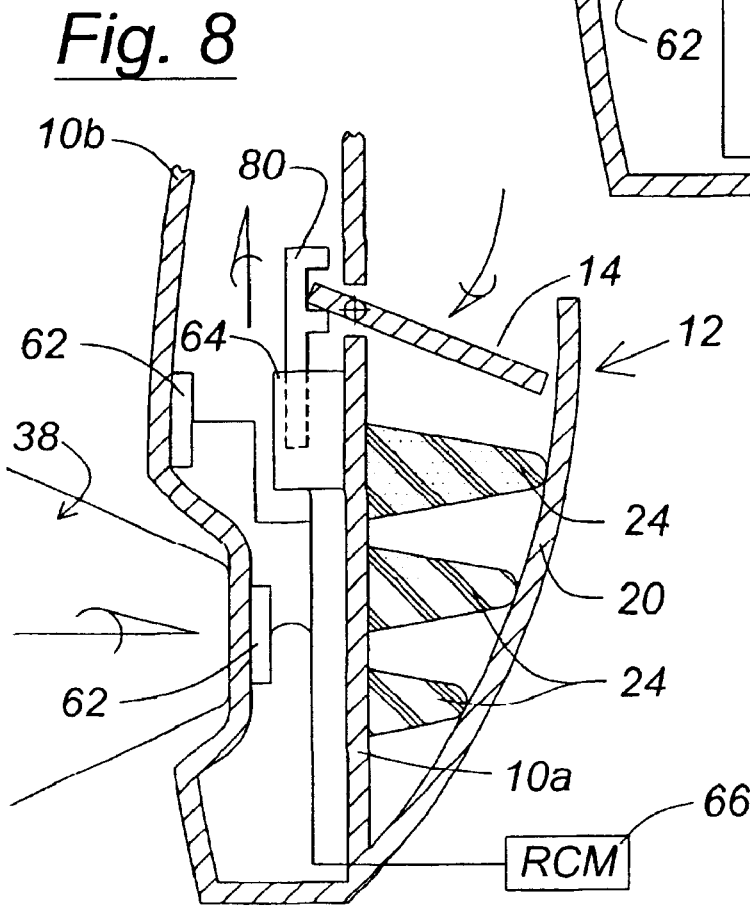

ACTIVE ARMREST FOR SIDE IMPACT PROTECTION

BACKGROUND OF THE INVENTION

1. Field of the Invention

This invention relates to an armrest located in the passenger compartment of an automotive vehicle, and specifically to such an armrest adapted for improved occupant protection during a crash.

2. Background

Automotive vehicles typically have an armrest located on the interior surface of each vehicle door. In addition to providing a surface on which the vehicle occupant seated immediately adjacent the door may rest his/her elbow and/or forearm, the armrest is often integrated with a door latch release lever and/or a grab handle used to open and close the door. Armrests must be relatively rigid and structurally strong to withstand the loads applied during everyday use of the vehicle.

Vehicle crash testing has indicated that a rigid armrest may increase the likelihood and/or severity of injury to an occupant during a collision in which the occupant forcefully strikes the armrest, such as when the vehicle is struck on its side by another vehicle or slides sideways into a stationary object. To reduce this possibility, it is known to construct the armrest so that it will yield or deform under the force of an impact with the occupant's body. Ideally, the armrest should deform in a manner to absorb some of the impact energy and avoid any rigid elements that project inward from the door inner surface and that could cause a concentration of the impact load on the occupant's body. It is difficult, however, to design and manufacture an armrest that is structurally strong enough to withstand the type of loads to which it may be subjected during everyday use and that is also capable of deforming so as to reduce injury in a crash.

SUMMARY OF INVENTION

The present invention provides an occupant protection system for a motor vehicle in which an upper arm support panel of an armrest is maintained in an arm-supporting position during normal vehicle operation, and is moved to a safety position by an actuation device upon sensing of an actual or impending impact on the side of the vehicle.

In the arm supporting position, the arm support panel contributes to the structural strength of the armrest so that it is able to withstand rugged use. In the safety position, the arm support panel is positioned so that it does not present a rigid edge oriented directly toward the occupant, but rather is in a partially or completely folded position. When in the safety position, if a side impact urges an occupant's body forcefully into contact with the armrest, the armrest is able to collapse to a position generally parallel with the interior surface of the vehicle sidewall so as to minimize injury to the occupant.

According to a preferred embodiment of the invention, the actuation device comprises a mechanical linkage having a contact pad disposed within the vehicle sidewall at a position where it will be urged inwardly when another vehicle strikes the subject vehicle. As the contact pad is urged inwardly, the mechanical linkage releases the arm support panel and so that it may be urged to the safety position by the mechanical linkage or by a stored energy device such as a spring.

According to another feature of the invention, an electronic actuation system comprises a microprocessor-based controller, a powered panel actuator, and one or more sensors for detecting or predicting a side impact. The panel actuator may be a pyrotechnic device, or may be an electromagnetically powered device such as a solenoid or an electrically actuated latch.

BRIEF DESCRIPTION OF THE DRAWINGS

FIG. 2 is a cross-sectional view taken along line 2—2 or FIG. 1 showing the armrest panel in a normal, arm-supporting position.

FIG. 3 is a view similar to FIG. 1 showing the armrest panel in a safety position.

FIG. 4 is a cross-sectional view showing a second embodiment of an active armrest with the panel in a normal, arm-supporting position.

FIG. 5 is a view similar to FIG. 4 showing the armrest panel in a safety position.

FIG. 6 is a schematic block diagram of an electronic armrest panel actuation system according to the invention.

FIG. 7 is a cross-sectional view showing a possible embodiment of an electronic armrest panel actuation system.

FIG. 8 is a view similar to FIG. 7 showing the armrest panel in a safety position.

DETAILED DESCRIPTION

Figure 1:
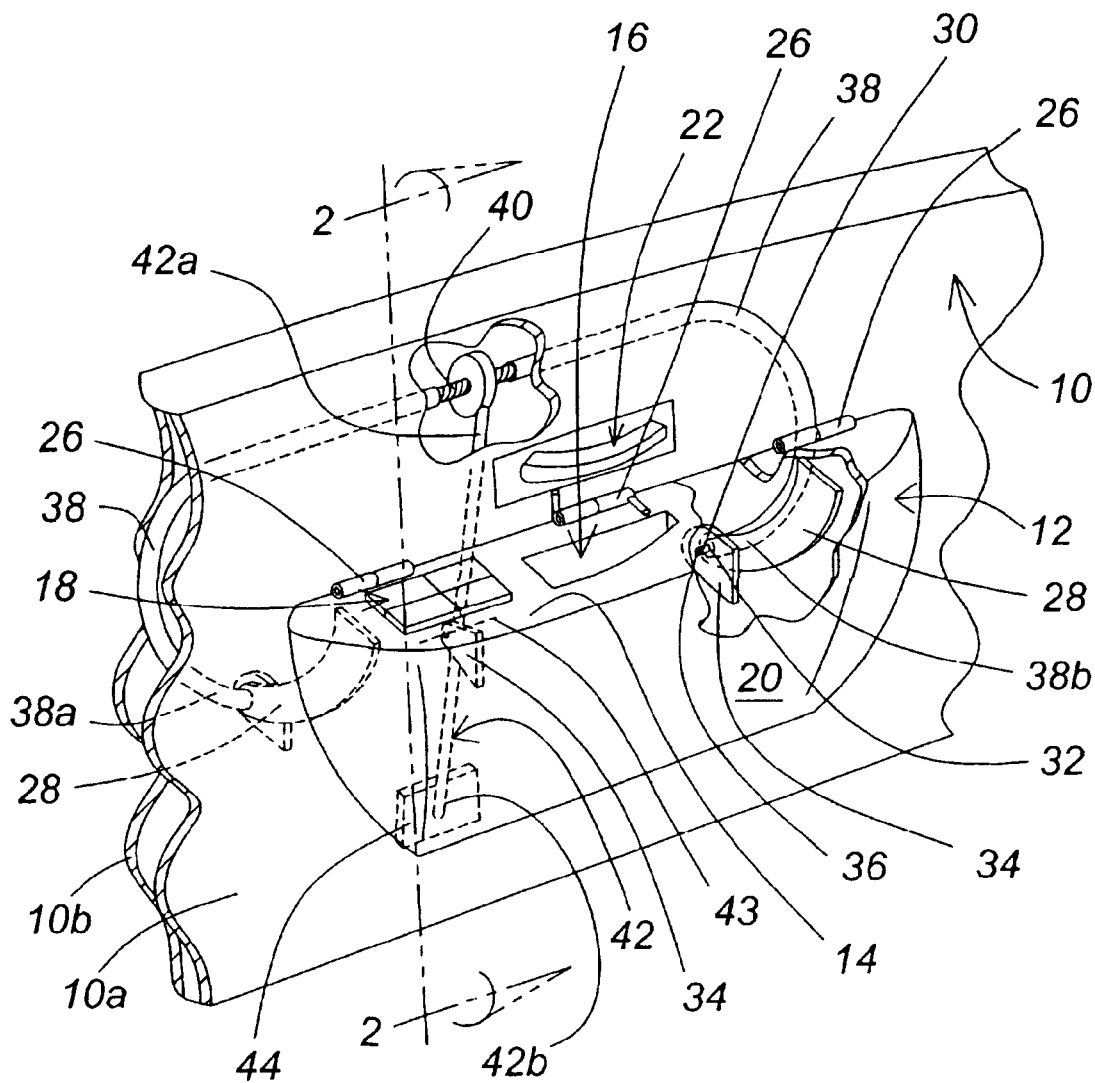
FIG. 1 is a partial perspective view of a sidewall of an automotive vehicle with an active armrest according to a first embodiment of the present invention.

As seen in FIGS. 1–3, a sidewall 10 of an automotive vehicle has an armrest 12 disposed on an interior surface thereof. Sidewall 10 is shown as comprising an interior wall 10a adjacent the passenger compartment of the vehicle and an exterior wall 10b forming the outer surface of the vehicle. The sidewall 10 is shown as including a door latch mechanism 22 such as would be present in an openable door, but it may alternatively be a fixed, non-opening side portion of the vehicle having an armrest, for example in a van where some of the rear seats are not adjacent to a door. Sidewall 10 may also comprise various components located between the inner and outer panels 10a, 10b, such as a window regulator (not shown) or side crash protection beams (not shown).

As used in this description, the terms such as "outboard," "outer" and "outward" indicate a direction or orientation away from or farther from a longitudinal centerline of the vehicle of which the sidewall 10 forms a part. Conversely, "inboard," "inner" and "inward" indicate a direction or orientation toward or closer to the longitudinal centerline. Terms such as "forward," "rearward," "lateral," "longitudinal," "horizontal" and "vertical" refer to the orientation of a particular component relative to the vehicle as a whole.

Armrest 12 comprises an arm support panel 14 projecting inwardly from the interior wall 10a and a trim panel 20 secured to the sidewall 10 immediately below the arm support panel 14. In most vehicles, arm support panel 14 is generally perpendicular to interior wall 10a so as to provide a surface on which an occupant of the seat adjacent the sidewall 10 may comfortably rest his/her elbow and/or forearm. Arm support panel 14 may be oriented generally horizontally, or may be inclined from the horizontal as it runs along the longitudinal axis of the vehicle, or may have two or more portions disposed at different angles, depending upon the particular installation in a vehicle. The upper surface of arm support panel 14 may be substantially flat or may be partially or completely concave or convex. All or a portion of the exposed surface of trim panel 20 may be formed separately and attached to the interior wall 10a as is well known in the vehicle interiors art. As seen in FIGS. 2 and 3, trim panel 20 may include energy-absorbing structures such as cone-shaped elements 24 which may be made as an integral part of the trim panel, or made of crushable foam or other appropriate material.

A grab hole 16 may be provided in the upper surface of the arm support panel 14 to receive an occupant's fingers and allow the occupant to pull the door to the closed position. Controls, switches, or other components, such as power window operating switches 18 or a power mirror control (not shown), may be disposed in or on arm support panel 14. Arm support panel 14 may be manufactured from any appropriate material or materials, such as plastic, metal, or composite material.

The outboard edge of arm support panel 14 is attached to trim panel 20 and/or to interior wall 10a by one or more hinges 26. Hinges 26 are shown as being visible for clarity, but are preferably hidden from view. Locking arms 28 project downwardly from the lower surface of arm support panel 14 and curve outwardly so that distal ends of the arms overlap respective lock tabs 34 that are secured to interior wall 10a. Holes 30 are formed in the distal ends of locking arms 28 and are aligned with matching holes 32 formed in lock tabs 34.

A mechanical linkage for actuating arm support panel 14 in the event of a side impact comprises a cable guide 38 disposed within sidewall 10 and having a first end 38a adjacent one locking arm 28 and a second end 38b adjacent the other locking arm. A cable 40 extends through the hollow interior of cable guide 38 and is axially slidable relative to the cable guide. Lock pins 36 are connected to the opposite ends of cable 40 and project through the aligned pairs of holes 30,32 in the locking arms 28 and lock tabs 34, thereby preventing rotation of arm support panel 14 about hinges 26.

The mechanical linkage further comprises a trigger lever 42 disposed within the sidewall 10 and pivotable about an axis 43 approximately parallel with the longitudinal axis of the vehicle. An upper end 42a of trigger lever engages cable 40 and a lower end 42b comprises a contact pad 44. Contact pad 44 is preferably positioned at a height at which it is likely to be the initial point of impact from another vehicle striking the subject vehicle. For example, the height of contact pad 44 may match the most common bumper height of other vehicles. Contact pad 44 is shown as being located closely adjacent to the exterior wall 10b (see FIG. 2), but it may be located farther inboard within sidewall 10. If contact pad 44 is located inboard of a window glass (not shown), a pusher block (not shown) may be provided between exterior wall 10b and the glass so that less deformation of the exterior wall will be required to move the contact pad. Contact pad 44 may be of any shape necessary to fit in the available space within sidewall 10 and avoid other components, and it may extend over a greater length of sidewall 10 than is shown in FIG. 1.

During normal vehicle operations, arm support panel 14 is maintained in the arm-supporting position (shown in FIGS. 1 and 2) wherein it is generally perpendicular to interior wall 10a as described above. When another vehicle 38 strikes the subject vehicle on or near the sidewall 10 with sufficient energy to deform exterior wall 10b, contact pad 44 is urged inward, causing trigger lever 42 to pivot about axis 43 so that the upper end 42a moves outwardly. This movement pulls on cable 40, drawing it through or along cable guide 38 so that lock pins 36 are pulled out of engagement with holes 30,32. When the mechanical linkage is in this released condition shown in FIG. 3, arm support panel 14 is free to rotate downwardly (clockwise as viewed in FIGS. 2 and 3) about hinges 26 to a safety position wherein the panel is no longer perpendicular to the interior wall 10a. Rotation of arm support panel 14 to the safety position may be caused solely by gravity, but is preferably assisted, speeded, or ensured by one or more stored energy device such as a spring. For example, one or more of hinges 26 may include a coil spring 27 biasing arm support panel 14 downwardly. Alternatively or in addition to a stored energy device, rotation to the safety position may be assisted, speeded, or ensured by providing a mechanical connection, such as a cable, between trigger lever 42 and arm support panel 14 to pull downwardly on the arm support panel upon movement of the trigger lever.

To realize safety benefits, the actuation mechanism needs to rotate arm support panel 14 away from the arm-supporting position only enough so that the arm support panel is not oriented directly edge-on to the occupant. Even if the actuation mechanism rotates the panel only approximately 20°, subsequent contact between the occupant's body and the armrest 12 during a collision will cause the arm support panel 14 to rotate further until it is substantially parallel with the interior wall 10a. It may be necessary for the distal ends of locking arms 28 to bend or otherwise deform upon contact with the inner surface of exterior wall 10b or other structure within sidewall in order for arm support panel 14 to rotate to a parallel position, and this deformation can also be used to absorb impact energy.

As an alternative to the downward rotation shown, stored energy devices and/or a mechanical connection may be used to force arm support panel 14 to rotate upwardly to the safety position. If the arm support panel rotates upwardly, the underside of the panel must be free of any protrusions that could contribute to injury.

The entire armrest 12 is preferably designed to absorb energy and provide cushioning during an impact. For example, cone-shaped elements 24 may be located between inner panel 10a and trim panel 20 so as to be crushed by the force of the occupant's body impacting the armrest 12, thereby absorbing energy and lessening the severity of injury. Many other energy absorbing means will be apparent to a person of skill in the art.

Only the portion of the armrest top surface in the area where the armrest is likely to contact the occupant's body during a side impact needs to move to the safety position. Accordingly, the movable portion of arm support panel 14 need not extend along the entire length of the armrest 10, but rather only the portion directly outboard of the occupant.

It may be desirable to provide points of engagement between arm support panel 14 and trim panel 20 in addition to hinges 26 in order to retain the arm support panel 14 securely in the arm supporting position. If this is the case, the actuation mechanism must serve to disengage these other points to allow arm support panel 14 to move to the safety position. For example, additional pins (not shown) may connect the inboard edge of arm support panel 14 to the trim panel 20, and cables or other connections may be attached to the pins to extract them in response to movement of the trigger lever 42. Trim panel, 20 could be stiffened if necessary by vertical or horizontal beads etc., if necessary to control occupant contact force.

In a second embodiment of the invention shown in FIGS. 4 and 5, the linkage mechanism comprises a trigger lever 50 similar to that of the embodiment of FIGS. 1–3 in that it is pivotable about an axis 51 approximately parallel with the longitudinal axis of the vehicle, and a lower end of the lever comprises a contact pad 52. The upper end of trigger lever 50 comprises a fitting 54 that engages the arm support panel 14 adjacent its outboard or hinged edge. In the preferred embodiment, the fitting has an inboard prong 54a and an outboard prong 54b that extend upwardly adjacent the respective inner and outer faces of a flange 56 projecting downwardly from the outboard edge of arm support panel 14.

Prior to the device being triggered by an impact on the side of the vehicle, the armrest is in the normal operating condition shown in FIG. 4. Trigger lever 50 is positioned so that the outboard prong 54b contacts the flange 56 on its lower edge and/or outer face and thereby holds arm support panel 14 in the arm supporting position. When the contact pad 52 is forced inward by a collision (see FIG. 5), the trigger lever 50 pivots about the axis 51 so the upper end moves outward and the inboard prong 54a contacts the flange 56. As trigger lever 50 continues to rotate to the released condition shown in FIG. 5, it urges flange 56 outwardly, causing arm support panel 14 to rotate downward about hinge to the safety position. The surfaces of fitting 54 and flange 56 that contact one another during this actuating motion may be angled, beveled, rounded, or otherwise contoured or shaped so that the movement of fitting 54 is effectively transferred to the flange 56 to cause arm support panel 14 to rotate to the safety position, and so that the arm support panel may rotate further downward as the trim panel 20 is crushed outwardly by contact with the occupant.

As with the first embodiment, there may be points of engagement between arm support panel 14 and trim panel 20 in addition to the fitting/flange engagement if necessary to hold the arm support panel 14 securely in the arm supporting position, the actuation mechanism serving to disengage these additional engagement points to allow arm support panel 14 to move to the safety position.

Many other possible mechanisms for achieving a movable arm support panel 14 will be apparent to those of skill in the art.

FIGS. 6–8 depict an embodiment of the invention utilizing an electronic panel actuation system. As shown schematically in FIG. 6, the system comprises a controller 60, a side impact sensor 62, and a panel actuator 64. Controller 60 is preferably a microprocessor-based device and may comprise or be integrated with a restraints control module 66 (RCM) connected other sensors, such as a front crash sensor 67, and controlling other occupant safety systems of the vehicle, such as airbags 68 and seatbelt pretensioners 70, as is well known in the vehicle restraints art. Side impact sensor 62 may be disposed in, on, or adjacent to the structure of the vehicle's sidewall and may comprise any appropriate type of device, such as an inertial sensor or a contact sensor such as those known to be used to actuate side airbags. In addition or alternatively to the side impact sensor 62, a pre-crash sensor 72 may be connected with controller 60 to provide a signal in response to a predicted impact with another vehicle. Pre-crash sensor 72 may utilize radio frequency, ultrasonic, laser, capacitive, or any other known type of non-contact detection.

Panel actuator 64 is operable to move or initiate movement of the arm support panel to a safety position upon receipt of a signal from the controller 60. The actuator 64 may be any appropriate electrically actuated device, such as a pyrotechnic actuator of the type known in the automotive occupant protection field, or an electromagnetically operated device such as a solenoid or an electrically operated latch and spring device. The controller 60 may also receive inputs from sensors located elsewhere in the vehicle, such as a vehicle dynamics sensor cluster 74 and/or a satellite positioning system receiver 76, such as a GPS unit. The vehicle dynamics sensors 74 and GPS unit 76 detect movements of the vehicle and may be used to trigger panel actuator 64 if a crash or other event causes lateral accelerations of a magnitude high enough to result in contact between the armrest and vehicle occupant. The controller 60, panel actuator 64, and the various sensors may be connected to a communications bus (not shown) to enable efficient and rapid communication between the devices.

FIGS. 7 and 8 show a possible wherein a panel actuator 64 is mounted on or adjacent to the interior wall 10a of a sidewall 10. Panel actuator 64 has a vertically movable piston 80, an upper end of which engages arm support panel 14 to retain the arm support panel in the arm supporting position (see FIG. 7) during normal operation of the vehicle. RCM 66 is electrically connected with panel actuator 64 and with one or more side impact sensors 62. Other possible system components such as those described in relation to FIG. 6 are not shown for simplicity. When either of side impact sensors 62 detects a side impact and/or lateral acceleration, RCM 66 makes an actuation decision and sends an actuation command to panel actuator 64. When the actuation command is received, piston 80 is driven upwardly, causing arm support panel 14 to pivot about axis 43 toward the safety position as shown in FIG. 8. If the actuation of piston 80 does not move arm support panel 14 to a vertical or nearly vertical orientation, the engagement between the piston and arm support panel is preferably such as to permit further downward/clockwise rotation of the arm support panel.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. An occupant protection system for a motor vehicle having a sidewall comprising an interior wall and an exterior wall and an armrest disposed adjacent the interior wall, the system comprising:

a panel forming a portion of the armrest, the panel movable between an arm supporting position wherein the panel is generally perpendicular to the interior wall and a safety position wherein the panel is relatively less perpendicular to the interior wall; and a panel actuation mechanism operative to urge the panel from the arm supporting position to the safety position in response to an impact on a side of the vehicle.

2. The apparatus according to claim 1 wherein the panel actuation mechanism comprises a stored energy device urging the panel toward the safety position.

3. The apparatus according to claim 2 wherein the stored energy device comprises at least one of a pyrotechnic actuator, an electromagnetic actuator, and a mechanical spring.

4. The apparatus according to claim 1 wherein the panel actuation mechanism comprises a mechanical linkage having a first end engaging the panel and a second end disposed adjacent the exterior wall, the linkage having a normal position wherein it retains the panel in the arm supporting position and movable in response to the impact to a released condition wherein it allows the panel to move toward the safety position.

5. The apparatus according to claim 4 wherein the mechanical linkage comprises a contact pad disposed below the panel and movable in an inward direction in response to the impact to initiate movement of the mechanical linkage to the released condition.

6. The apparatus according to claim 5 wherein the mechanical linkage further comprises a trigger lever having a lower end engaging the contact pad and pivoting about an axis above the contact pad to move to the released condition.

7. The apparatus according to claim 6 wherein an upper end of the trigger lever engages a cable.

8. The apparatus according to claim 6 wherein an upper end of the trigger lever engages the panel.

9. The apparatus according to claim 4 wherein movement of the mechanical linkage to the released position urges the panel to the safety position.

10. The apparatus according to claim 1 wherein the panel actuation mechanism comprises an electronic sensor operative to detect at least one of an actual impact and a predicted impact.

11. The apparatus according to claim 10 wherein the sensor comprises at least one of an inertial sensor and a ranging sensor.

12. The apparatus according to claim 10 wherein the sensor is associated with a restraints control module operative to control occupant protection devices other than the panel.

13. The apparatus according to claim 1 further comprising a hinge connected to an edge of the panel adjacent the interior wall and said movement of the panel from the arm supporting position to the safety position comprises rotation of the panel about the hinge.

14. An occupant protection system for a motor vehicle having an interior wall, the system comprising:
    an armrest disposed adjacent the interior wall and comprising a panel having an arm supporting position wherein the panel is relatively perpendicular to the interior wall and movable to a safety position wherein the panel is relatively less perpendicular to the interior wall; and
    a panel actuation mechanism operative to hold the panel in the arm supporting position during normal vehicle operations and urge the panel from the arm supporting position to the safety position in response to at least one of an actual impact on a side of the vehicle and a predicted impact on the side of the vehicle.

15. The apparatus according to claim 14 wherein the panel actuation mechanism comprises a mechanical linkage having a first end engaging the panel and a second end disposed adjacent the interior wall, the linkage having a normal position wherein it retains the panel in the arm supporting position and movable in response to the impact to a released condition wherein it allows the panel to move toward the safety position.

16. The apparatus according to claim 14 wherein the panel actuation mechanism comprises a stored energy device urging the panel toward the safety position.

17. The apparatus according to claim 15 wherein the mechanical linkage comprises a contact pad disposed below the panel and movable in an inward direction in response to the impact to initiate movement of the mechanical linkage to the released condition.

18. The apparatus according to claim 17 wherein the mechanical linkage further comprises a trigger lever having a lower end engaging the contact pad and pivoting about an axis above the contact pad to move to the released condition.

19. The apparatus according to claim 18 wherein an upper end of the trigger lever engages a cable.

20. The apparatus according to claim 15 wherein movement of the mechanical linkage to the released position urges the panel to the safety position.

* * * * *